US012416270B1

(12) United States Patent
Meyer

(10) Patent No.: US 12,416,270 B1
(45) Date of Patent: Sep. 16, 2025

(54) TWO STROKE ENGINE

(76) Inventor: Daniel J. Meyer, Rushville, IL (US)

( * ) Notice: Subject to any disclaimer, the term of this patent is extended or adjusted under 35 U.S.C. 154(b) by 0 days.

(21) Appl. No.: 13/136,354

(22) Filed: Jul. 29, 2011

Related U.S. Application Data

(60) Provisional application No. 61/400,511, filed on Jul. 29, 2010.

(51) Int. Cl.
*F02D 41/00* (2006.01)
*F02B 1/12* (2006.01)
*F02B 3/06* (2006.01)

(52) U.S. Cl.
CPC ............ *F02D 41/0025* (2013.01); *F02B 1/12* (2013.01); *F02B 3/06* (2013.01)

(58) Field of Classification Search
CPC ........ F02B 2075/025; F02B 2075/1808; F02B 25/00; F02B 2700/037; F02B 3/06
USPC .................................. 123/65 R, 66, 70 R, 72
See application file for complete search history.

(56) References Cited

U.S. PATENT DOCUMENTS 1,168,425 A * 1/1916 Rosenhagen ........... F02B 25/00 123/65 V
1,856,048 A * 4/1932 Ahrens ................... F02B 25/00 74/44
2,271,011 A * 1/1942 Hubbard ................. F02B 25/00 123/70 R
3,774,581 A * 11/1973 Lundy
3,880,126 A * 4/1975 Thurston ................. F02B 33/22 123/65 VD
4,344,405 A * 8/1982 Zaharis ................... F02B 75/22 123/568.14
4,506,634 A * 3/1985 Kerrebrock
5,275,134 A * 1/1994 Springer ................. F02B 59/00 123/42
5,526,778 A * 6/1996 Springer
5,785,015 A * 7/1998 Philippe .................. F02B 33/02 123/560
6,019,075 A * 2/2000 Galka et al.
6,026,769 A * 2/2000 Anbarasu et al.
6,216,649 B1 * 4/2001 Laydera-Collins ... F02F 7/0019 123/70 R
6,227,165 B1 * 5/2001 Motose ................... F02B 25/14 123/305
6,601,549 B2 * 8/2003 Clarke
6,994,057 B2 * 2/2006 Loth et al.
7,047,918 B1 * 5/2006 Polimeni, Jr. ........... F01L 3/205 123/73 V
8,720,396 B2 * 5/2014 Gentili et al.
(Continued)

FOREIGN PATENT DOCUMENTS

CA 2619915 A1 * 8/2009 ............ F01L 1/0532

OTHER PUBLICATIONS

Ogaki, Jap. Pat. No. 61,142,327, Jun. 30, 1986.
Kamiyama, Jap. Pat. No. 61,268,825, Nov. 28, 1986.

*Primary Examiner* — Lindsay M Low
*Assistant Examiner* — Ruben Picon-Feliciano

(57) ABSTRACT

A two stroke internal combustion engine contains an engine block, at least one power cylinder in the engine block, and at least one pump cylinder in the engine block associated with each power cylinder. A conduit communicates between an outlet of the pump cylinder and an inlet of the power cylinder. A timer coordinates movement of a piston in the power cylinder, a piston in the pump cylinder, and a valve in the conduit.

45 Claims, 15 Drawing Sheets

(56) References Cited

U.S. PATENT DOCUMENTS

| | | | | |
|---|---|---|---|---|
| 2003/0106520 | A1* | 6/2003 | Fiveland | F02B 1/12 123/294 |
| 2003/0116106 | A1* | 6/2003 | Clarke | F02B 1/12 123/65 VD |
| 2004/0025816 | A1* | 2/2004 | Paut | F02B 33/22 123/70 R |
| 2005/0229908 | A1* | 10/2005 | Kuzuyama | F02D 35/025 123/552 |
| 2006/0124086 | A1* | 6/2006 | Fabrega | F02B 25/24 123/73 PP |
| 2008/0295798 | A1* | 12/2008 | Reitz | F02D 41/3035 123/299 |
| 2009/0056687 | A1* | 3/2009 | Pien | F02B 25/14 123/73 R |
| 2009/0199828 | A1* | 8/2009 | Luttgeharm | F02D 13/0276 123/65 R |
| 2011/0023814 | A1* | 2/2011 | Shkolnik | F01C 1/20 123/210 |
| 2013/0312704 | A1* | 11/2013 | Taylor | F02B 23/101 123/44 C |

* cited by examiner

TWO STROKE ENGINE

CROSS REFERENCE TO RELATED PATENT

This application claims the benefit of U.S. Provisional Application Ser. No. 61/400,511, Jul. 29, 2010.

FIELD OF THE INVENTION

This invention relates to internal combustion engines. More particularly, this engine relates to engines which are multi-fueled or can burn many different fuels. This invention combines the components of the two stroke engine with those of the four stroke engine which allows this engine to produce emissions in similar ranges, as the four stroke engine, yet with greater power density than either the two stroke or the four stroke engine.

BACKGROUND OF THE INVENTION

The two stroke engine has dominated the market for many years, in where high power to weight ratio engines are required. This includes chainsaws, weed eaters, boat motors, motorcycles and many other applications. These engines are now being removed from the market due to their poor emissions characteristics. These poor emissions occur for several reasons. A first reason most two stroke engines yield poor emissions is that most of these engines require oil to be mixed with the fuel for lubrication and the oil is burnt in the process. A second reason is that a lot of the fuel escapes into the exhaust port during the cleaning or scavenging of the two stroke power cylinder.

Hubbard, U.S. Pat. No. 2,271,011 issued Jan. 27, 1942 discloses an engine which is very close in structure to the XS-Air engine. However Hubbard teaches nothing about yielding clean emissions and in fact Hubbard teaches an invention which would produce poor emissions. In Hubbard's specification he explains that the air and fuel charge are used to "force out all the remaining products of combustion from the previous charge". This type of premixed scavenging is similar to what has taken place with gasoline two stroke engines for the last 50 years, which have been plagued with polluting the environment, causing the removal of the two stoke engines from many power applications.

Hubbard further discloses that his valve is a free floating check valve which is operated in the two opposite traveling directions primarily by cylinder pressure. Hubbard further teaches that a weak spring was added to the free floating check valve simply to eliminate a clicking noise encountered during low rpm operation of his invention. Hubbard further never teaches anything about diesel operation as his invention is of spark ignition only.

Laydera-Collins, U.S. Pat. No. 6,216,649 issued Apr. 17, 2001 discloses an engine which similarly to the XS engine tries to clean up the emissions of the two stroke engine. Laydera-Collins teaches the limiting of fuel loss by forcing in fuel and air from a pump cylinder into the power cylinder, after the exhaust ports have closed. Although Laydera-Collins teaches not loosing fuel to the exhaust by trapping all the fuel in the power cylinder he completely ignores the burning of lubricating oil and thus somewhat defeats the goal of the lowering of poor emissions. To this end Laydera-Collins retains the dominant structure of the common two stroke as he uses both intake and exhaust ports for scavenging which requires the burning of lubricating oil. An intake port is not used in the XS-Air engine.

Paut, U.S. Pat. No. 6,874,454 issued Apr. 5, 2005 discloses an engine which addresses the area of no fuel lost to the exhaust. Paut however uses a very long compressing pipe and must use an additional exhaust reed valve to stop air from retuning back into the pump cylinder. Paut further never teaches anything about diesel operation as his invention is of spark ignition. Paut is not able to use a simple carburetor with his invention as this would produce poor emissions. Further Paut uses a rotative exhaust valve in the power cylinder as the preferred embodiment.

Anbarasu et al., U.S. Pat. No. 6,026,769 issued Feb. 22, 2000 discloses an engine which is very similar to Laydera-Collins invention, U.S. Pat. No. 6,216,649. A fuel rich mixture is injected under pressure into the power cylinder from a pump cylinder. This mixture must then mix with the air which was trapped during the scavenging process. Both the pump and the power cylinder in this invention use their crank cases for pumping which should cause poor emissions. This invention employs an intake port located in the power cylinder as well. This structure requires the use of lubricating oil which is trapped in the scavenging process and burnt, producing poor emissions.

Zaharis, U.S. Pat. No. 4,344,405 issued Aug. 17, 1982 discloses an engine which tries to provide a head which will cause the fuel and air mixture forced into the power chamber, by the pump cylinder, to not mix with the exhaust gases and to keep the fuel and air undiluted with the exhaust gases. Zaharis further requires the use of an outlet valve in the intake of the intake manifold or transfer passage.

Meldolesi et at., U.S. Pat. Appln. Publ. No. 2010/0236533 issued Sep. 23, 2010 discloses an engine which uses and advanced valve seat system. The invention also employs an outwardly opening crossover compression (XovrC) valve which the XS-Air engine does not employ nor use.

Alvarez, U.S. Pat. Appln. Publn. No. 2009/0151663 issued Jun. 18, 2009 discloses and engine of which is a two stroke opposed piston diesel engine design which was used extensively in the past. This invention does not employ a piston pump as the XS-Air engine.

Ogaki, Jap. Pat. No. 61,142,327 issued Jun. 30, 1986 discloses an engine which uses a rich mixture of gas which is compressed into the power cylinder by a pump cylinder.

Kamiyama, Jap. Pat. No. 61,268,825 issued Nov. 28, 1986 discloses an engine which uses the crankcase to induct and pump out the fuel air charge. This invention requires the use of lubricating oil in the crankcase which will mix with the fuel and air and be burnt in the combustion process thus producing poor emission characteristics as typical two stroke engines.

Objects and Advantages

The XS-Air engine will yield a significant gain in power to weight ratios as compared to both the present four stroke and two stroke engines. This is largely in part due to the ability of the pump cylinder to pump large amounts of air into the system. In addition a low cost pumping cylinder which is rather simple in design, this provides for a low cost supercharger as well. The production of favorable emissions is a large advantage to the XS-Air engine. Both the pump and the power cylinder crankcases can be ran in an oil bath without losing oil to the combustion of the engine. Hydrocarbons will also substantially all be trapped and burnt making the engine very environmentally friendly.

REFERENCE NUMERALS IN THE DRAWINGS

Figure 1:
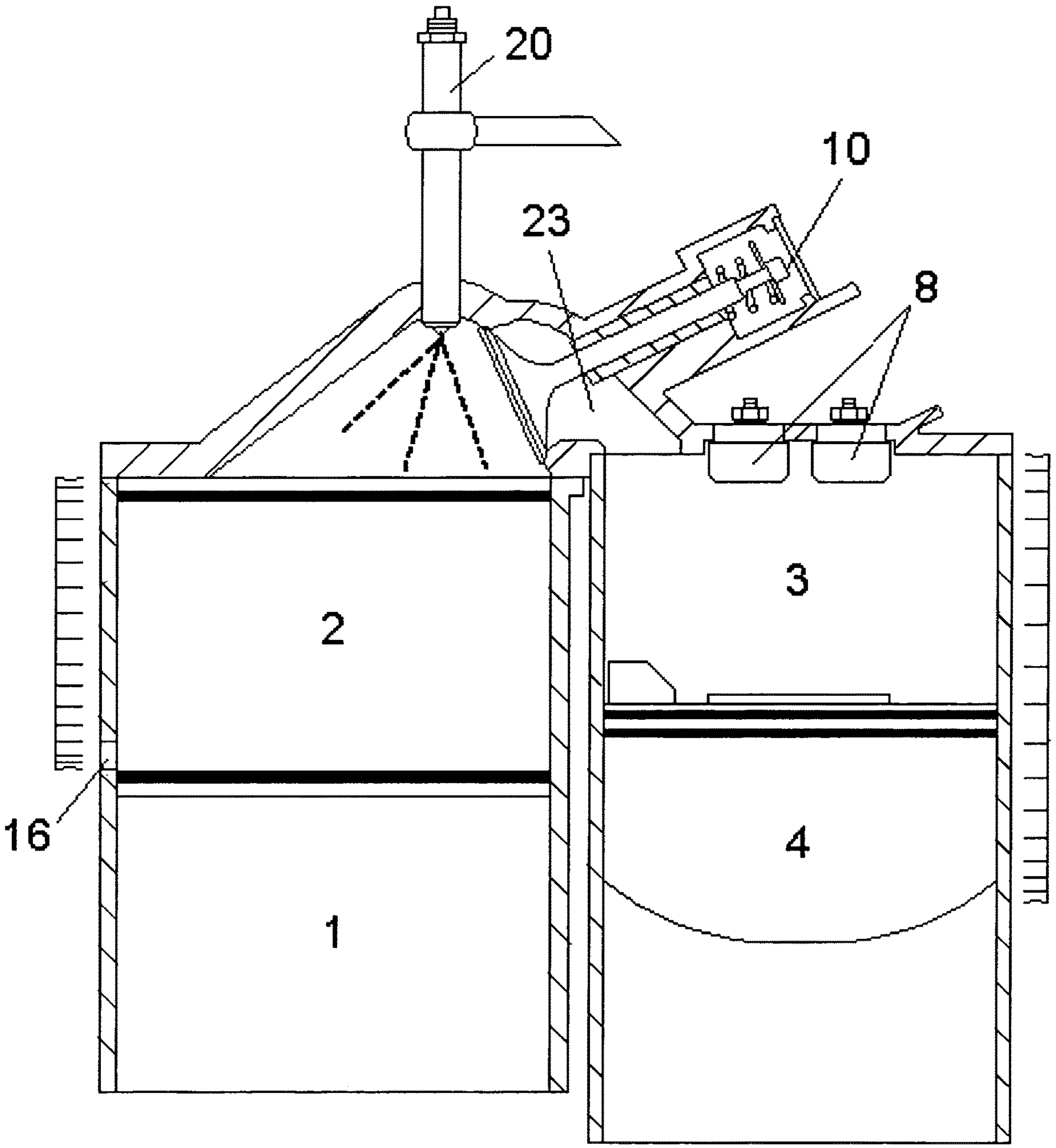
FIG. 1 shows one preferred embodiment of the XS engine which operates on the Diesel Cycle.

1. Power cylinder
2. Power piston
3. Pump cylinder
4. Pump piston
5. Crank shaft
6. Cam follower
7. Spark plug
8. Reed valve
9. Cam
10. Conduit valve
11. Cam follower/lifter
12. Rocker arm
13. Push rod
14. Second crank shaft
15. Lifter
16. Exhaust port
17. Power piston rod
18. Pump cylinder rod
19. Variable port height device
20. Fuel injector
21. Carburetor
22. Pump Boost
23. Conduit
24. Variable crank timing device
25. Variable pressure conduit valve
26. Glow plug

THE PREFERRED EMBODIMENT

Referring to FIG. 1. In the most simple definition this engine consist of a power cylinder 1 with an exhaust exit 16 that is open when the power piston 2 is near the bottom of the stroke. A fresh charge is introduced to the power cylinder from the pump. This charge can be used to scavenge the power cylinder 1 and also to boost the power cylinder by loading some of the charge after the exhaust exit 16 is closed. When the power piston 2 is near the top of its stroke initiation of combustion can take place by various means. One means is using a fuel injector 20 to complete a standard diesel cycle. Another option is to mix fuel into the delivered air charge from the pump and to then initiate combustion using a premixed compression ignition cycle. Additionally a sparking device can be used to initiate combustion.

The pump in FIG. 1 consist of a cylinder 3 and a piston 4 of which a fresh charge is introduced into the pump inlet 8 on the downward stroke of the piston and then compressed into the conduit 23 as the pump piston moves upward. The fresh charge is forced into the power cylinder through the conduit valve 10. The scavenging process can be used for the entire upward movement of the pump piston 4. Scavenging can take place for some portion of the pump pistons 4 upward movement until the ports close and then the power cylinder can be boosted by the final upward travel of the pump piston 4. This total scavenging only cycle or a mixed scavenging and boosting cycle can be produced, and then varied, by changing the pump to power cylinder timing, raising or lowering the exhaust port height, varying the area of the ports, varying the number open exhaust ports, changing the spring pressure on the conduit valve 10, by changing the rpms, or by varying the size of the conduit or the conduit valve.

Figure 2:
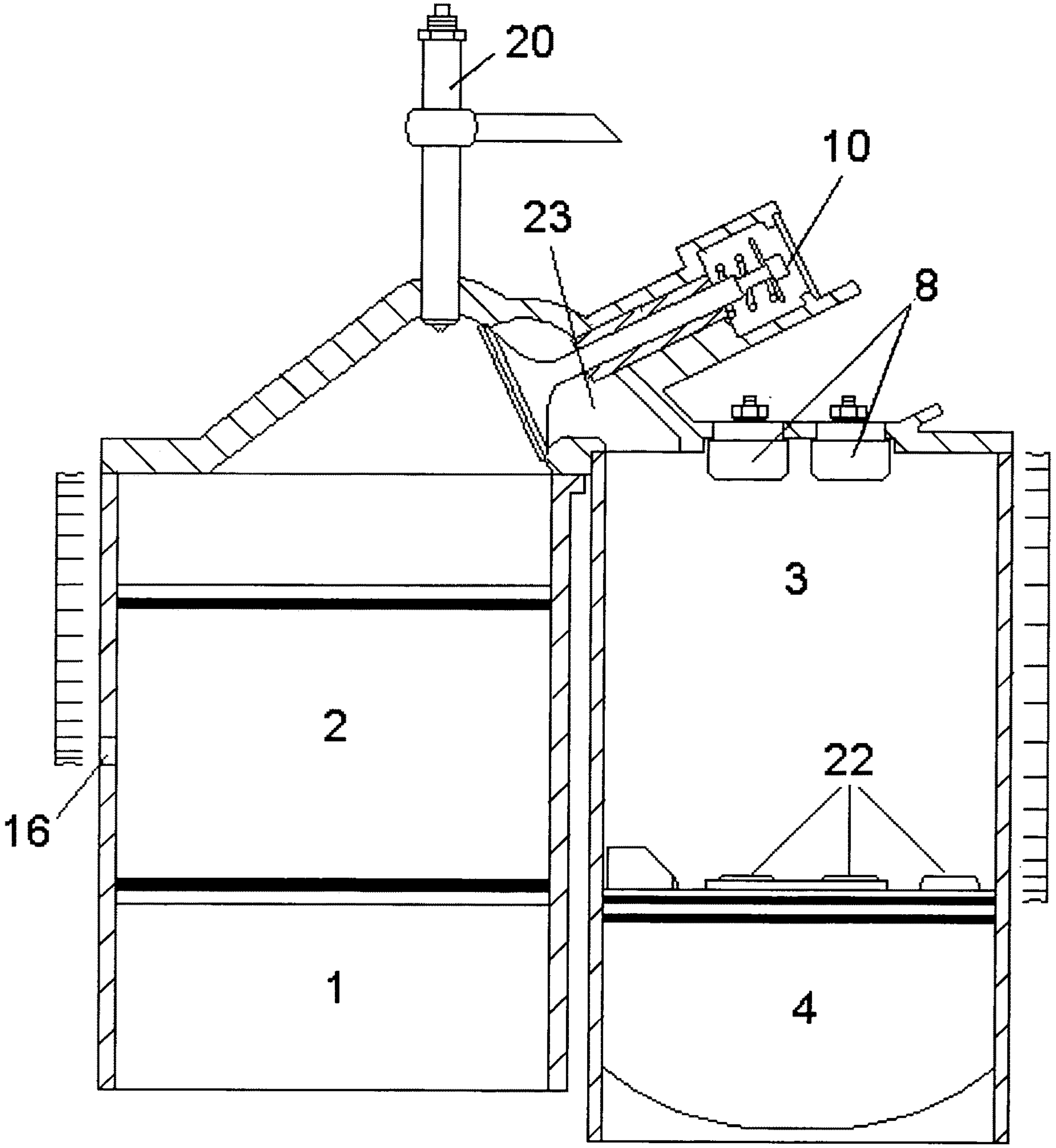
FIG. 2 shows the same embodiment as FIG. 1 with the addition of crankcase boosting of the pump.

FIG. 2 shows the same embodiment as FIG. 1 with the addition of using the crank case to boost the pump cylinder which will provide a larger fresh charge to the XS-Air engine. This type of engine should use modern oil less compressor technology to allow the use of the crankcase for pumping without introducing lubricating oil to the fresh charge. This could provide favorable emissions.

Figure 3:
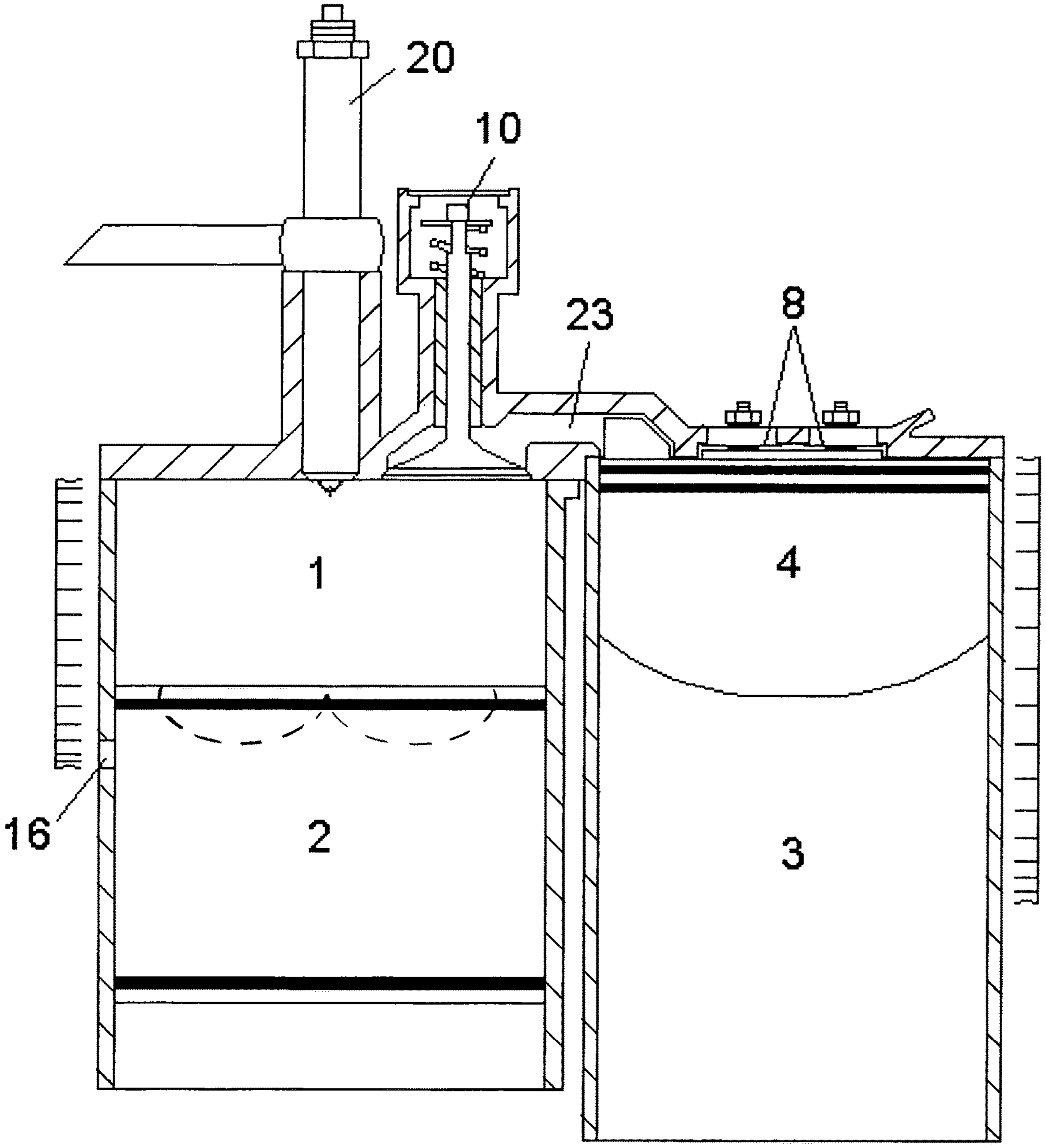
FIG. 3 shows the same embodiment as FIG. 1 with the injection into a piston bowl.

FIG. 3 shows the same embodiment as FIG. 1 with a piston bowl used for mixing the charge.

Figure 4:
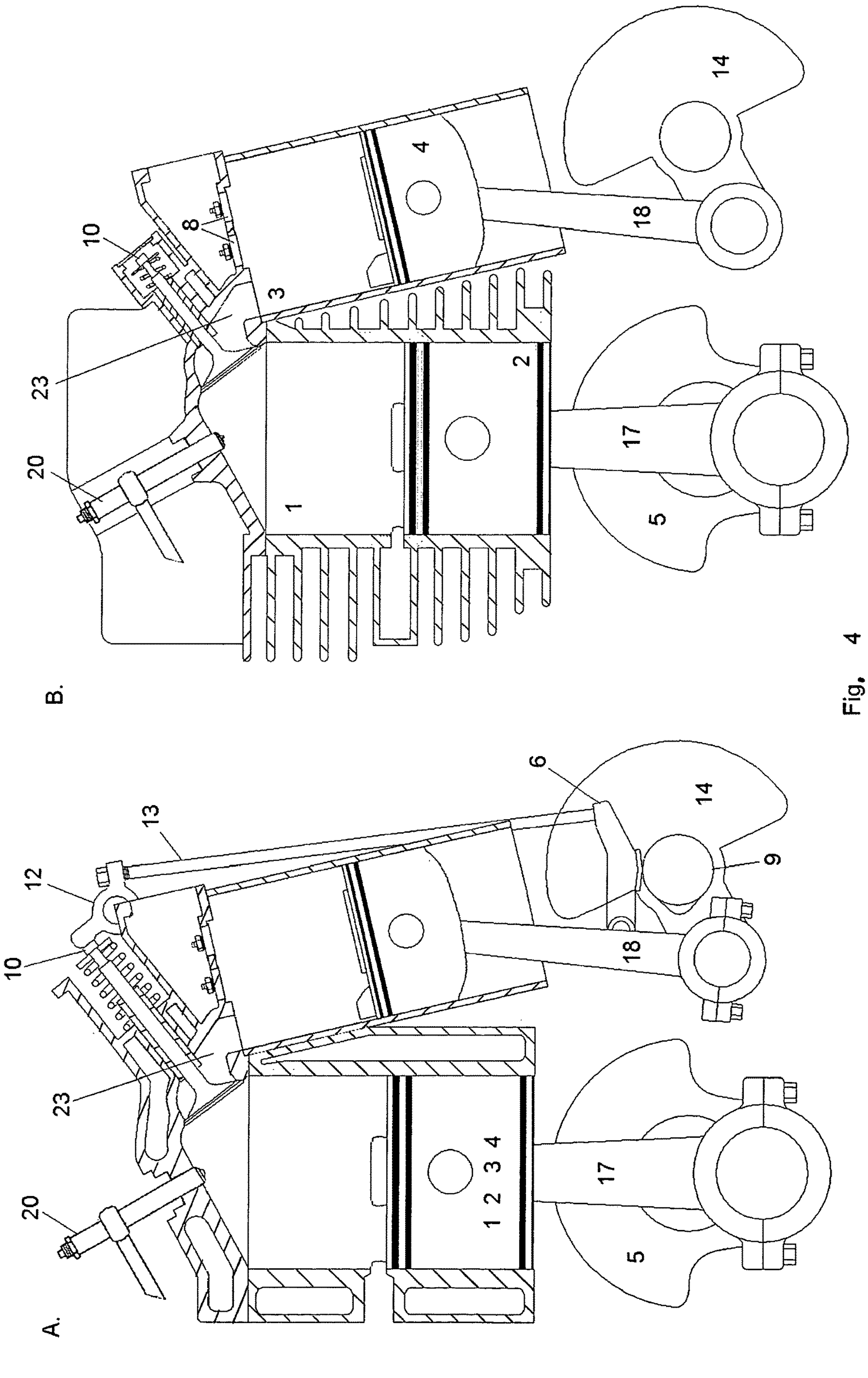
FIG. 4*a* shows the diesel embodiment using a cam activated poppet valve for the conduit vale and two separate crankshafts.
FIG. 4*b* shows the diesel embodiment using a pressure relief conduit valve.

FIG. 4*a* shows a XS-Air diesel engine using a dual crankshaft embodiment. In addition the conduit valve used is a cam activated poppet valve 10. A cam follower 6 is used to lift a push rod 13, which moves a rocker arm 12 to open the valve. The power crankshaft 5 is seen which moves the power piston rod 17. The second pump crankshaft 14 is used to move the pump cylinder rod 18.

FIG. 4*b* shows the same diesel embodiment as FIG. 1 in where separate crankshafts are used to drive the power piston and the pump piston.

Figure 5:
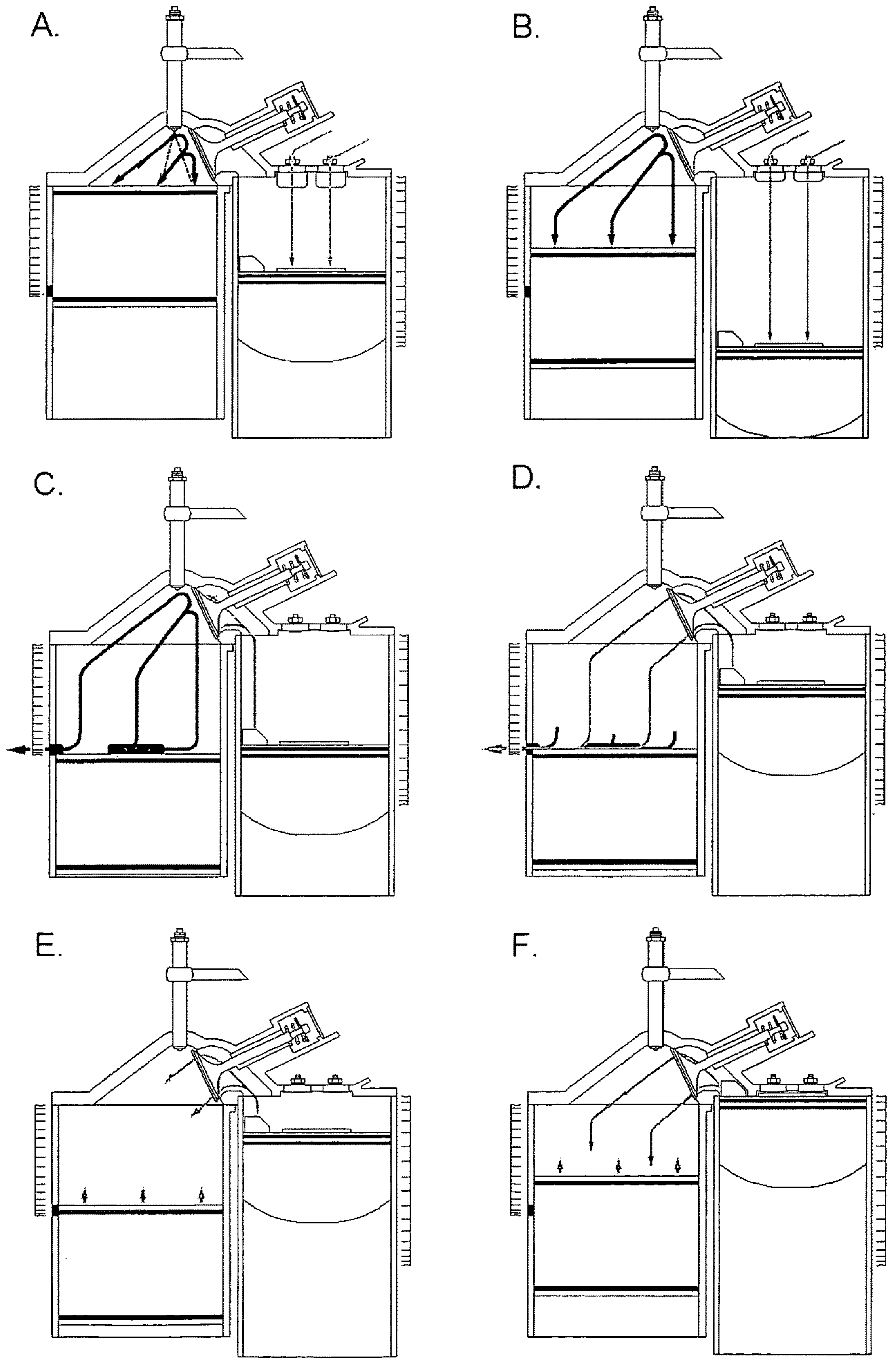
FIG. 5 shows a preferred XS-Air diesel operating cycle.

FIG. 5 illustrates the XS-Air diesel cycle.

Figure 6:
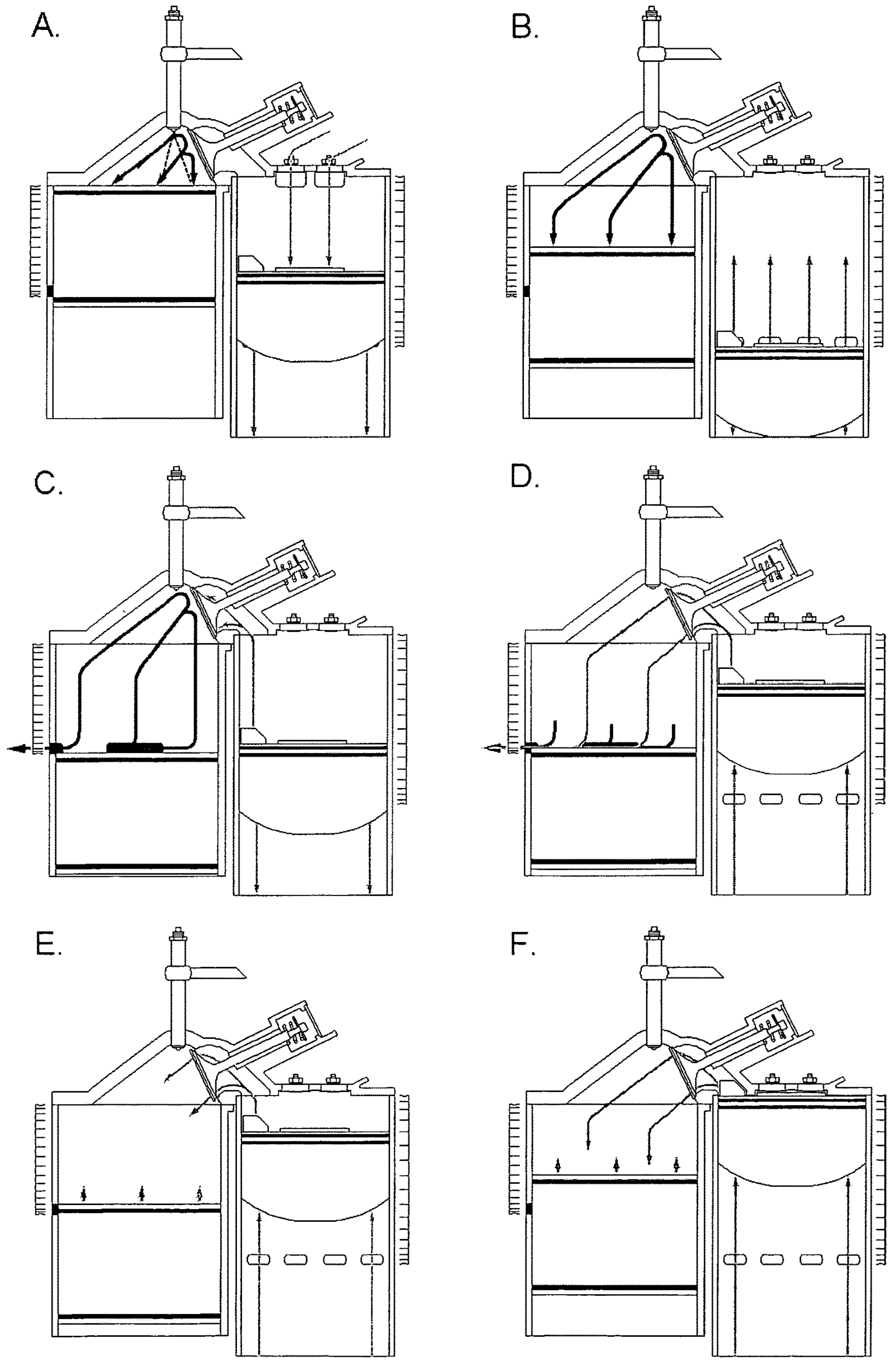
FIG. 6 shows a XS-Air diesel operating cycle in where the pump is boosted the pump crankcase.

FIG. 6 illustrates the XS-Air diesel cycle with the pump cylinder boosted by its crankcase.

Figure 7:
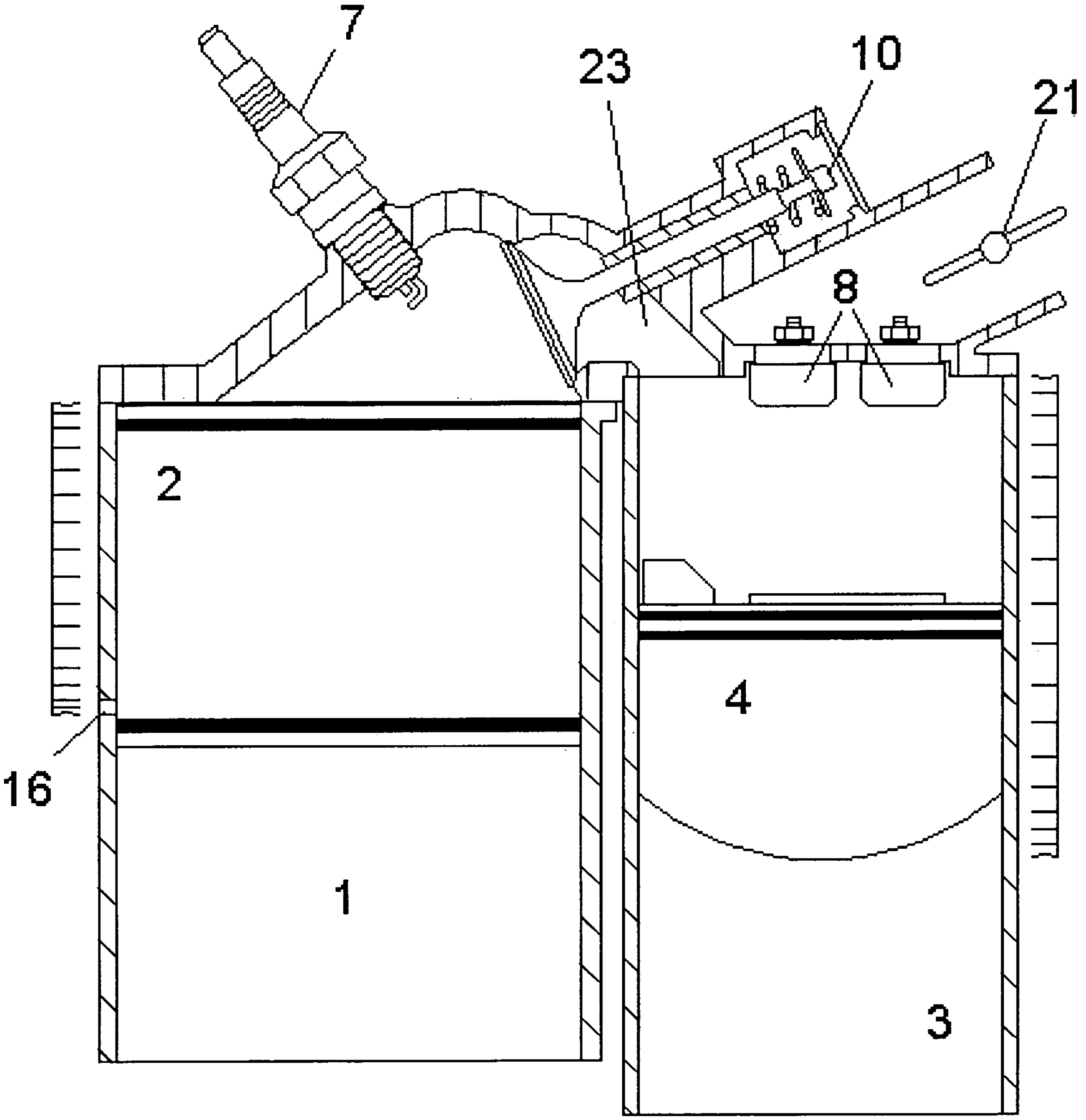
FIG. 7 shows a Preferred embodiment of the XS-Air engine which operates with a spark ignition cycle.

FIG. 7 shows the XS-Air spark ignition preferred embodiment. This XS-Air engine uses a carburetor 21 to mix fuel with the air charge prior to entering the pump inlet 8. A spark plug 7 is used to initiate combustion in the power cylinder 1.

Figure 8:
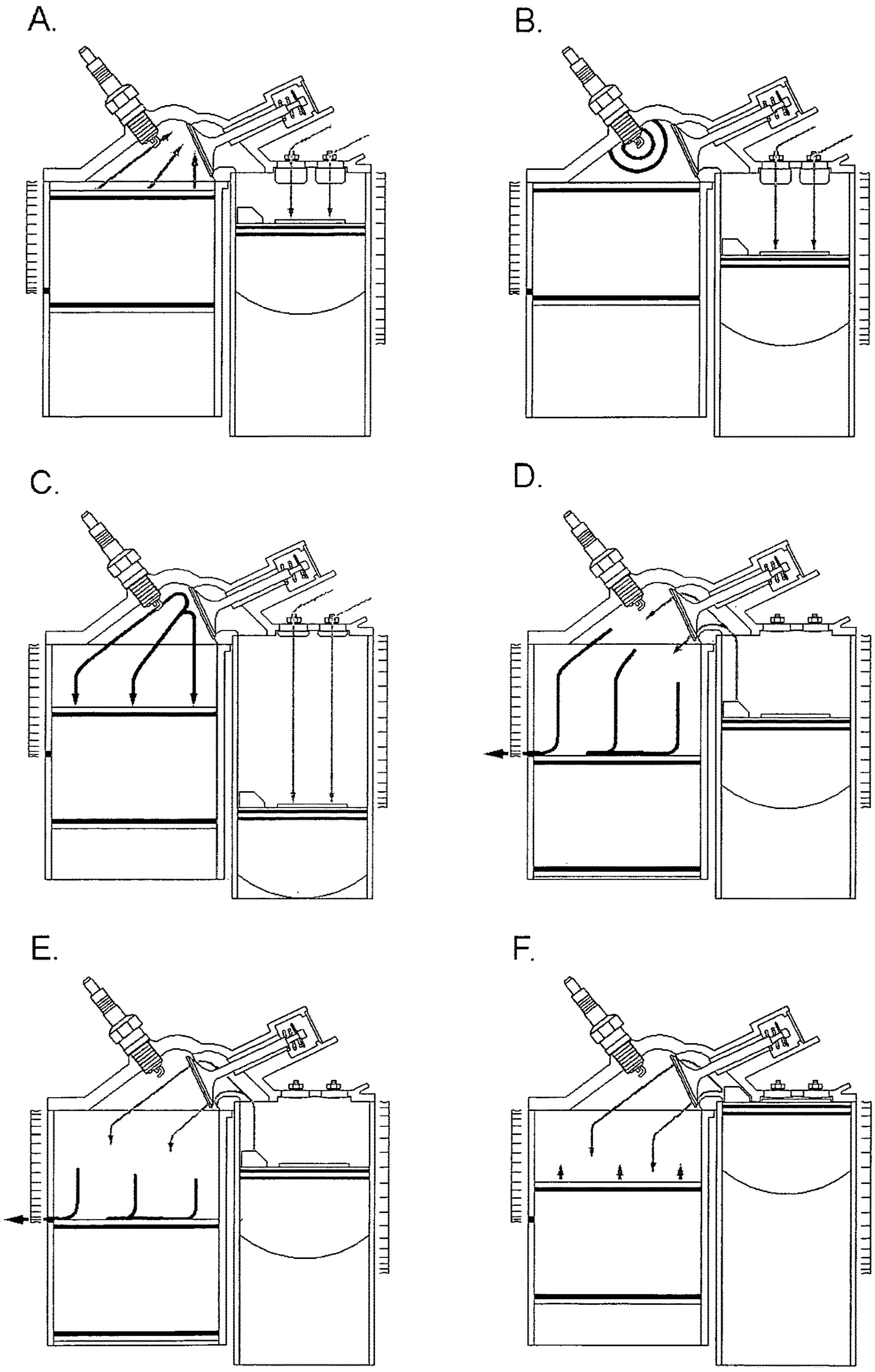
FIG. 8 shows a preferred XS-Air spark ignition operating cycle.

FIG. 8 illustrates the XS-Air spark ignition cycle.

Figure 9:
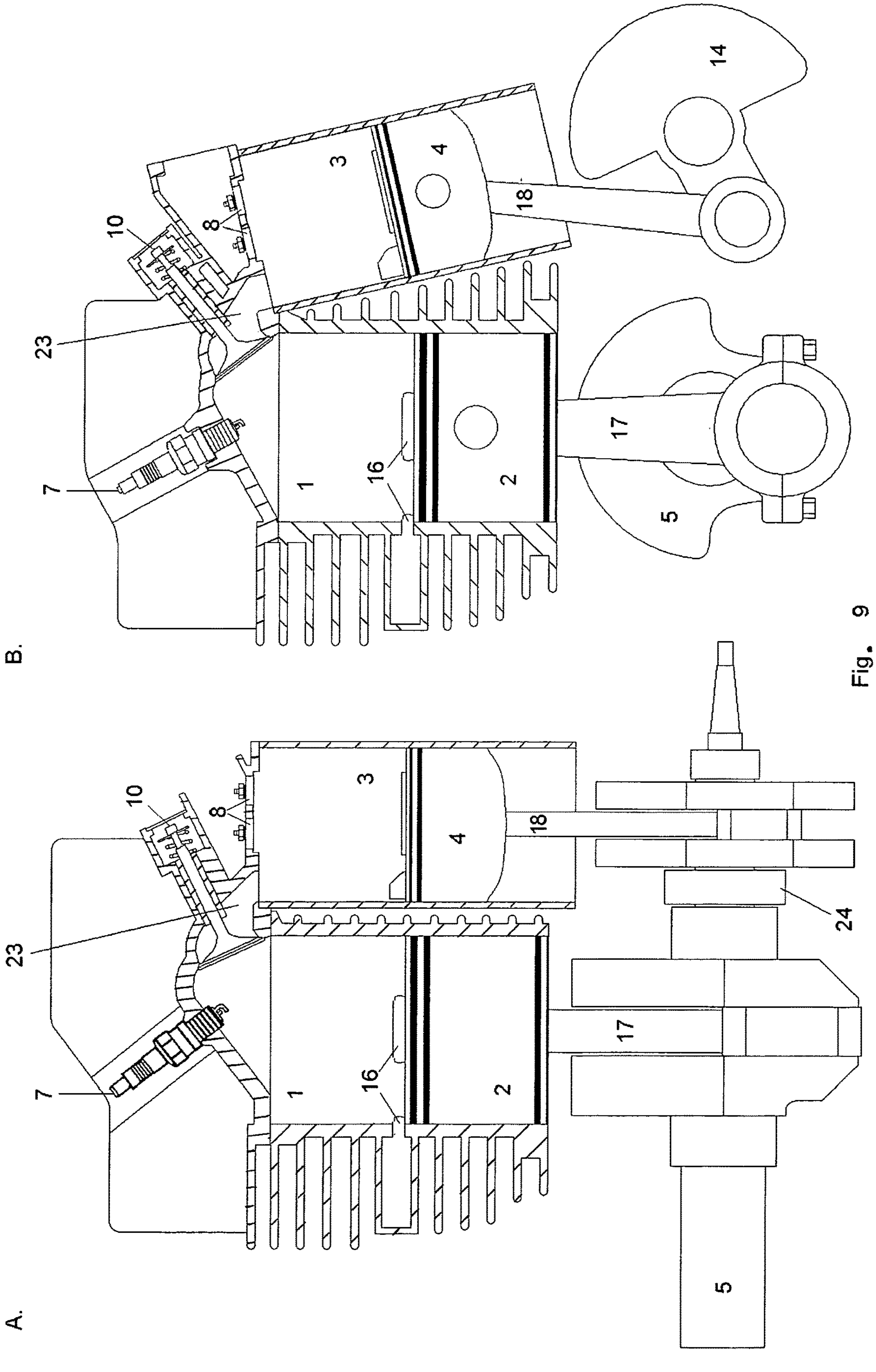
FIG. 9*a* shows a show a single crankshaft embodiment of the XS-Air spark ignition engine.
FIG. 9*b* shows a show a two separate crankshaft embodiment of the XS-Air spark ignition engine.

FIG. 9*a* shows a spark ignition XS-Air engine employing a single crankshaft.

FIG. 9*b* shows a spark ignition XS-Air engine employing a separate power crankshaft 5 than the pump crankshaft 14.

Figure 10:
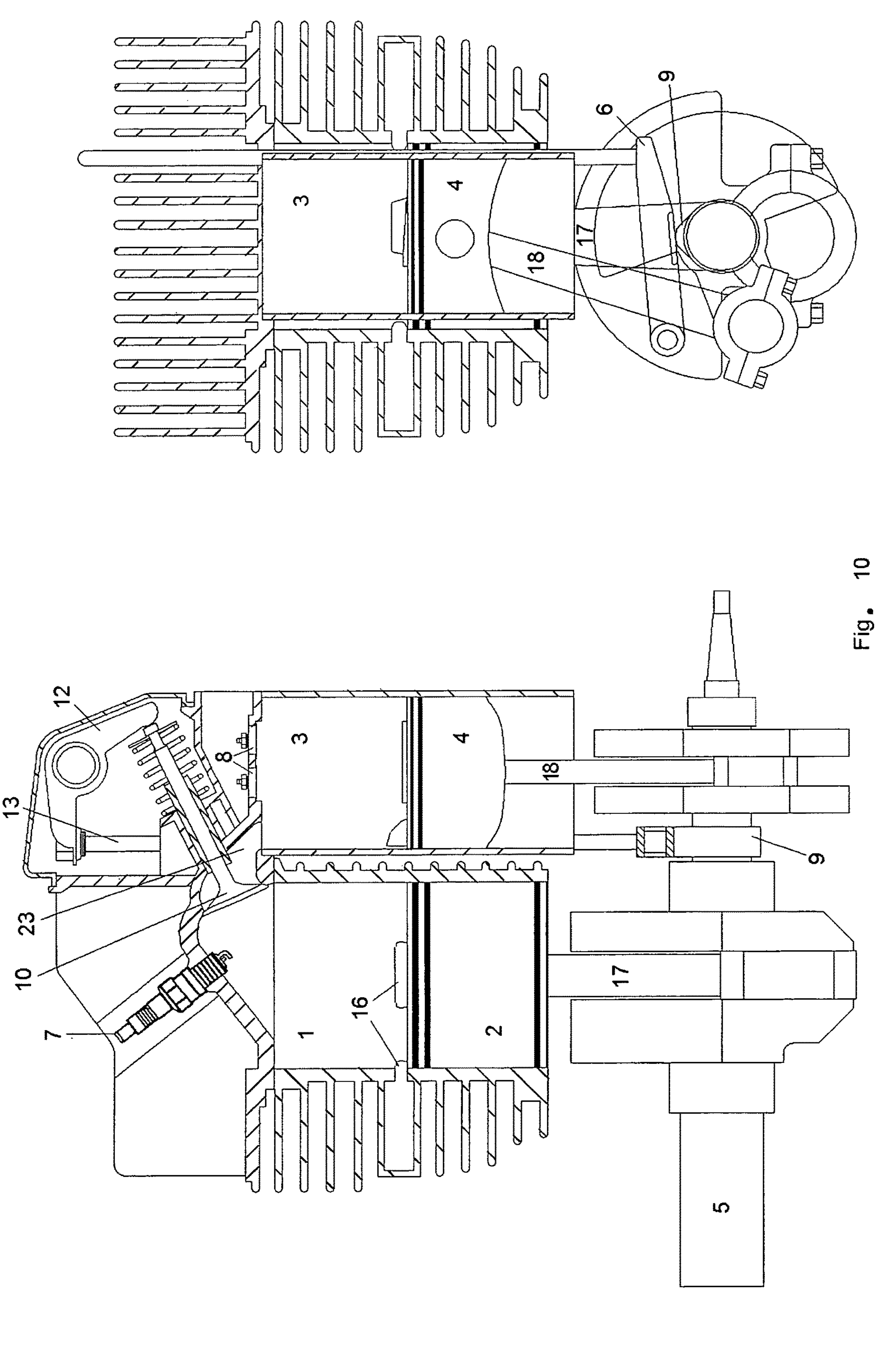
FIG. 10 shows a show a single crankshaft embodiment of the XS-Air spark ignition engine with a cam activated poppet valve.

FIG. 10 shows a spark ignition XS-Air engine employing a unique valve train system.

Figure 11:
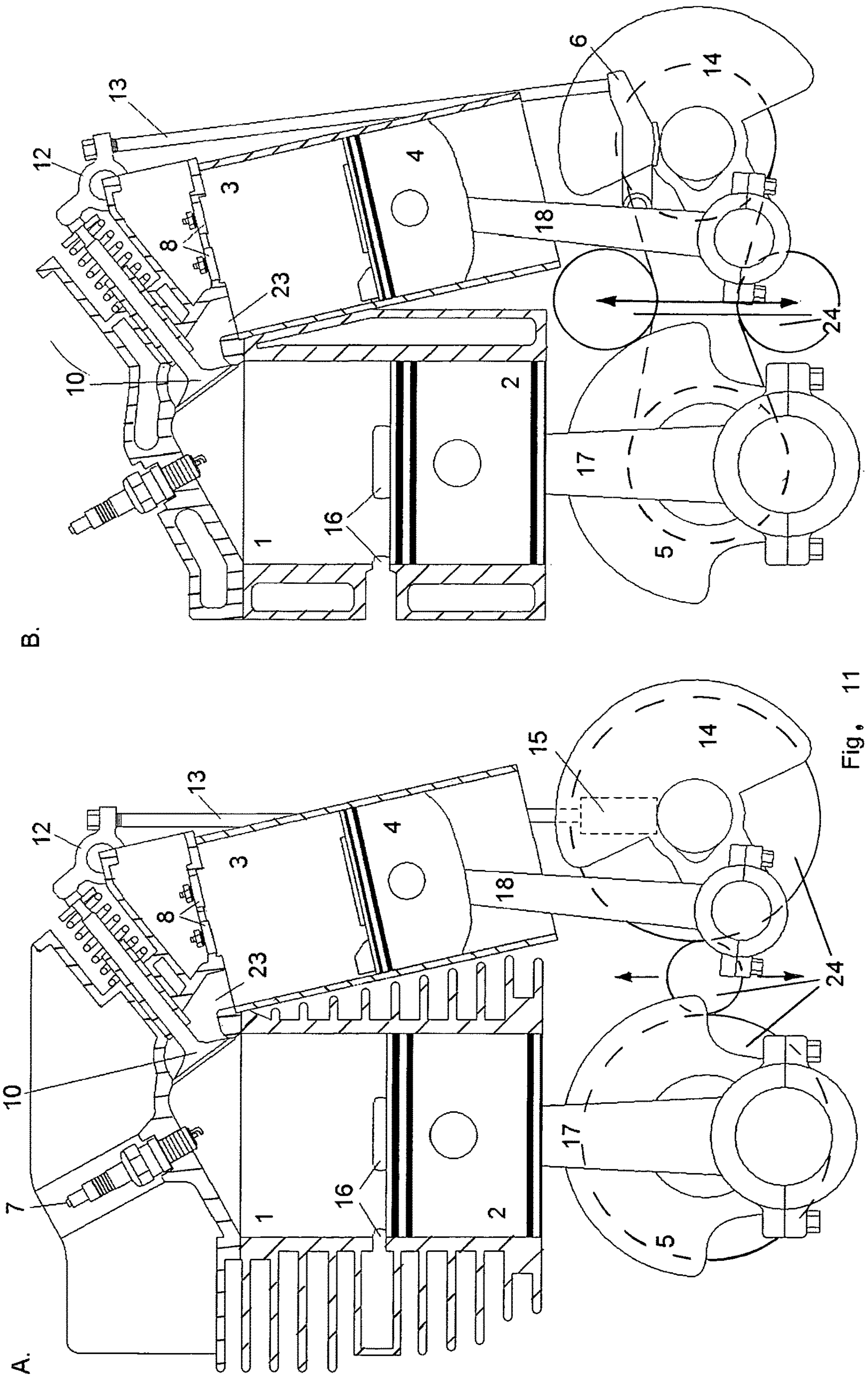
FIG. 11*a* shows a show a spark ignition embodiment of the XS-Air engine with a variable crankshaft timing system employing gears.
FIG. 11*b* shows a show a spark ignition embodiment of the XS-Air engine with a variable crankshaft timing system employing a belt or chain.

FIG. 11*a* shows a spark ignition XS-Air engine employing a unique valve train system which uses a lifter 15 in addition to a variable crank timing system using a moveable gear which advances and retards the power piston and the pump piston timing.

FIG. 11*b* shows a spark ignition XS-Air engine employing a variable crank timing system using a chain or belt which in where idling pulleys advance and retard the power piston and the pump piston timing.

Figure 12:
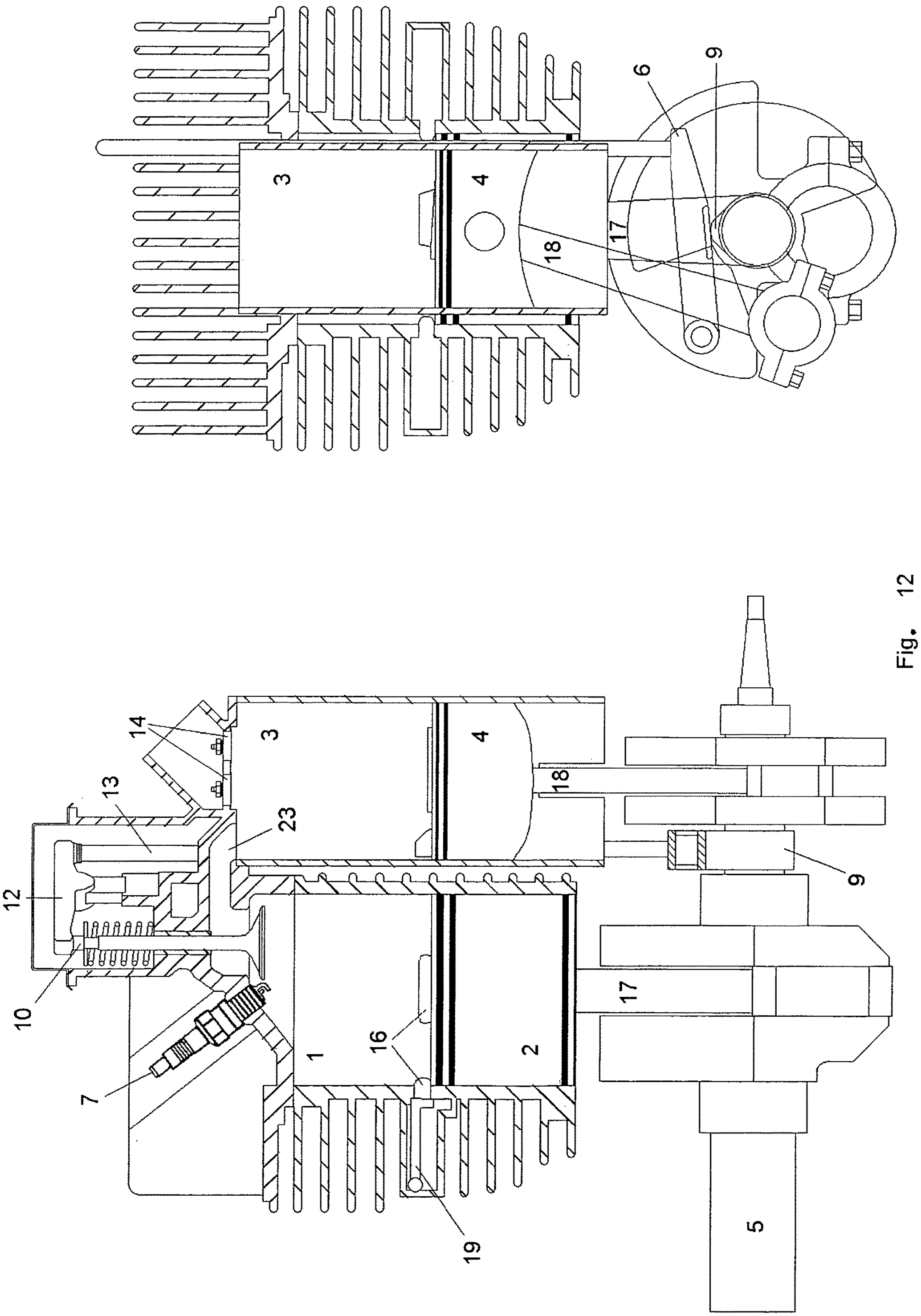
FIG. 12 shows a spark ignition embodiment of the XS-Air engine with variable exhaust port heights.

FIG. 12 shows a spark ignition XS-Air engine employing variable port height device 19. This valve is use to change the amount of air which escapes to the exhaust during the scavenging process.

Figure 13:
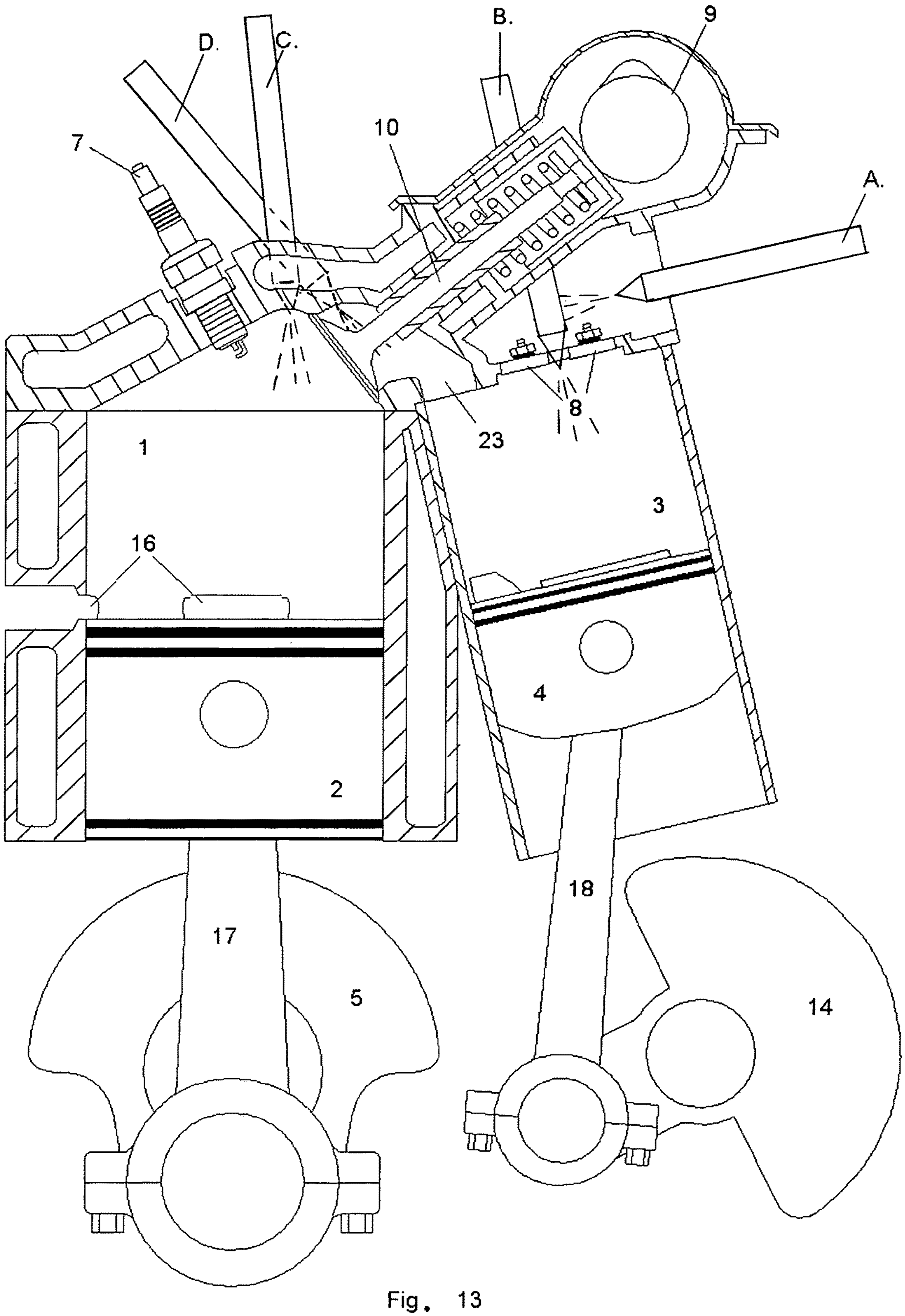
FIG. 13 shows a spark ignition embodiment of the XS-Air engine with four different possible fuel injector placements.

FIG. 13 shows a spark ignition XS-Air engine employing fuel injection for delivery to the power cylinder 1. The figure shows four possible fuel injector positions. Fuel injector A. shows the injector placed to inject fuel upstream of the pump inlet 8. Fuel injector B. shows the injector placed to inject fuel directly into the pump cylinder 3. Fuel injector C. shows the injector placed to inject fuel directly into the conduit 23. Fuel injector D. shows the injector placed to inject fuel directly into the power cylinder.

Figure 14:
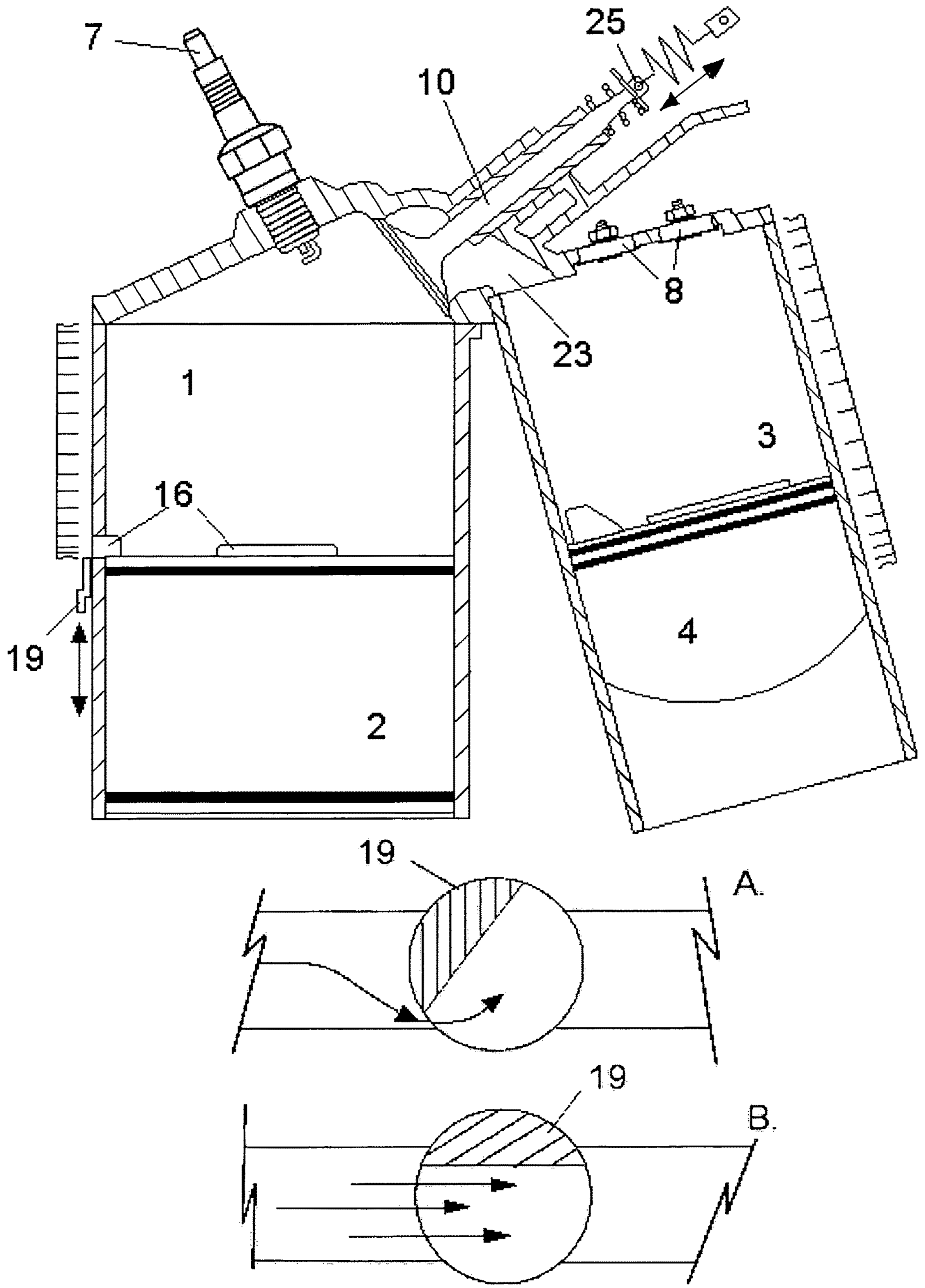
FIG. 14 shows a spark ignition embodiment of the XS-Air engine with a variable pressure conduit valve and a possible variable port height device.

FIG. 14 shows a spark ignition XS-Air engine employing a variable port height device 19 in addition to a variable pressure conduit valve 25. This valve can be assisted in closing by a mechanical or electrical even a hydraulic device or others.

FIG. 14 also shows a rotary variable exhaust height device which can vary the area of the exhaust port 16.

Figure 15:
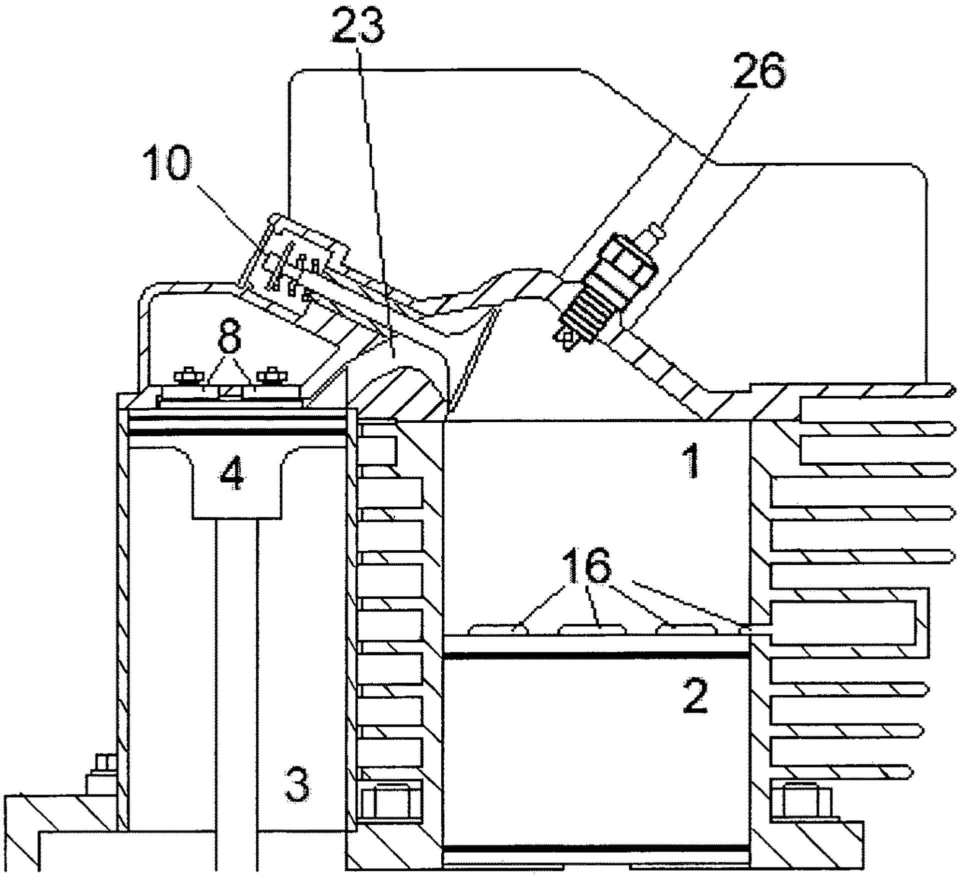
FIG. 15 shows a premixed diesel embodiment of the XS-Air engine.
Figure 16:
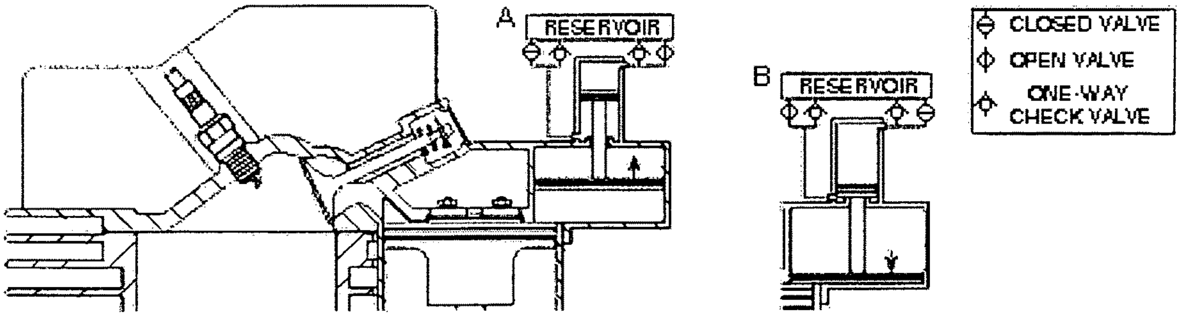
FIG. 16 shows a variable clearance volume device.

FIG. 15*a* shows a premixed compression ignition XS-Air engine which can be supplied fuel either through a carburetor or a fuel injection system. The engine ignites the fuel through compression as the power piston nears the top of its stroke. This is the type of engine cycle used by small RC engines. This figure shows a possible glow plug 26, which is used to initiate start up only, with these engines.

FIG. 15*b* shows a spark ignition XS-Air engine employing a variable clearance volume device for the pump. This allows for varying the air delivery to the power cylinder during operation by recycling more or less of the air in the pump cylinders due to the varying clearance volume.

SUMMARY, RAMIFICATION, AND SCOPE

The XS-Air engine can operate when using various modes of operation or cycles. The diesel cycle is carried out when a fuel injector 20 injects fuel directly into the power cylinder 1 to initiate combustion. A premixed compression ignition cycle is carried out when fuel is mixed with air in the power cylinder 1 and then the initiation of combustion is then carried out using compression. Lastly the spark ignition cycle can be carried out by providing a fuel and air mixture in the power cylinder 1 and using an ignition device such as a spark plug to ignite the fuel and air mixture.

By changing the pump to power cylinder timing, raising or lowering the exhaust port height, varying the area of the ports, varying the number open exhaust ports, changing the spring pressure on the conduit valve 10, by changing the rpms, or changing the size of the conduit or the conduit valve, the air flows can be varied with these methods or devices to provide that substantially all the fuel and air is trapped in the engine and is combusted. This is of primary importance in providing good emissions characteristics.

This is of utmost concern in the spark ignition or premixed compression ignition XS-Air embodiments. These variable devices can be set or programmed to insure that substantially all the fuel and air is burnt in the engine.

A pressure relief valve used for the conduit valve should also act as a pressure regulating valve in that the pressure in the pump will be controlled and thus the air delivered to the power cylinder 1 can be controlled and regulated as to not allow any fuel and air to escape to the exhaust prior to being burnt. This pressure regulating valve can be varied as seen in the figures.

I claim:

1. A two stroke internal combustion engine comprising:

at least one power cylinder, each said power cylinder having an inlet, an outlet, and a reciprocating power piston that creates a variable internal volume as it moves between an upward position and a downward position;

at least one pump cylinder associated with each said power cylinder, each said pump cylinder having an inlet, an outlet, and a reciprocating pump piston that creates a variable internal volume, each said pump cylinder adapted to receive air, and no fuel, into the said pump cylinder as the said pump piston moves downwardly, and to pump the air, through an air transfer conduit and directly into the said power cylinder as the pump piston moves upwardly;

said conduit communicating between the said outlet of the pump cylinder, and the said inlet of the power cylinder, the said conduit having at least one valve at the said inlet of the power cylinder, that opens as the said pump piston moves upwardly;

a timer for coordinating movement of the said power piston, and the said pump piston;

a fuel injector which injects only fuel, and no air, a portion of said fuel injected when the said power piston is near its Top Dead Center position, creating a mixture of fuel and air, in the said power cylinder; and a means for igniting the mixture in the said power cylinder when the said power piston is at its upward position, the burning and expansion of which, moves the said power piston downwardly, and produces work.

2. The engine of claim 1 wherein the said conduit valve comprises a gas pressure operating valve.

3. The engine of claim 1 wherein the said conduit valve comprises a gas pressure relief valve.

4. The engine of claim 1 wherein the said conduit valve comprises a poppet Valve.

5. The engine of claim 4 wherein the said exhaust outlet of the said power cylinder is an exhaust port located in the sidewall of said power cylinder and compression temperature is used for igniting the said mixture in the said power cylinder.

6. The engine of claim 5 wherein the said conduit valve comprises a gas pressure operating valve.

7. The engine of claim 1 wherein the said pump cylinder inlet comprises a reed valve.

8. The engine of claim 4 wherein the said exhaust outlet of the said power cylinder is an exhaust port located in the sidewall of said power cylinder and an electronic device is used for igniting the said mixture in the said power cylinder.

9. The engine of claim 1 wherein the said pump cylinder inlet comprises a reed valve.

10. The engine of claim 1 wherein the said outlet of the power cylinder is a port.

11. The engine of claim 1 wherein the said conduit valve comprises a variable pressure operating valve.

12. The engine of claim 1 wherein the said conduit valve comprises a gas pressure operated poppet valve.

13. The engine of claim 1 wherein the said timer comprises a means for varying the timing of the said power piston and said pump piston.

14. The engine of claim 1 wherein the pump cylinder crankcase is used to add air to the said pump cylinder.

15. The claim of 1 wherein compression temperature is used for igniting the mixture in the said power cylinder.

16. The engine of claim 1 wherein there is no valve at said pump cylinder outlet.

17. The claim of 1 wherein a spark plug is used to ignite the said mixture of fuel and air in the power cylinder.

18. The engine of claim 1 wherein the said conduit valve is cam operated.

19. The engine of claim 1 wherein the said conduit valve is operated by a combination of gas pressure and cam activation.

20. The engine of claim 1 wherein the said pump has a variable clearance volume.

21. The engine of claim 1 wherein the said exhaust outlet of the power cylinder has a variable opening area.

22. The engine of claim 1 wherein the said exhaust outlet of the said power cylinder has a variable back pressure.

23. A two-stroke compression-ignition internal combustion engine comprising:

at least one power cylinder, each said power cylinder having an inlet, an outlet, wherein said outlet of the said power cylinder is at least one exhaust port located in a side wall of the said power cylinder, the said side wall of the said power cylinder parallel to a longitudinal axis of the said power cylinder, and a reciprocating power piston that creates a variable internal volume as it moves between an upward position and a downward position;

a pump cylinder associated with each said power cylinder, each said pump cylinder having an inlet, an outlet, and a reciprocating pump piston that creates a variable internal volume, each said pump cylinder adapted to receive air, and no fuel, into the said pump cylinder as the said pump piston moves downwardly, and to pump the air, and no fuel, into the said power cylinder as the said pump piston moves upwardly;

a conduit communicating between the said outlet of the pump cylinder and the said inlet of the power cylinder, the said conduit having at least one valve at the said inlet of the power cylinder, that opens as the said pump piston moves upwardly;

a timer for coordinating movement of the said power piston and the said pump piston;

a fuel injector, which injects only fuel, and no air, into the said power cylinder, creating a mixture of fuel and air, in the said power cylinder; and compression temperature is used for igniting the mixture in the said power cylinder, the burning and expansion of which, moves the said power piston downwardly, and produces work.

24. The engine of claim 23 wherein the said conduit valve comprises a poppet valve.

25. The engine of claim 23 wherein the said pump has a variable clearance volume.

26. The engine of claim 23 wherein there is no valve at said pump cylinder outlet.

27. The engine of claim 23 wherein the said exhaust outlet of the power cylinder has a variable area.

28. The engine of claim 23 wherein the said conduit valve comprises a variable gas pressure operating valve.

29. The engine of claim 23 wherein the said timer comprises a means for varying the timing of the said power piston and said pump piston.

30. The engine of claim 23 wherein the said conduit valve is operated by cam activation.

31. The engine of claim 23 wherein the said pump cylinder inlet comprises a reed valve.

32. The engine of claim 23 wherein the said conduit valve comprises a gas pressure operated poppet valve.

33. The engine of claim 23 wherein the pump cylinder crankcase is used to add air to the said pump cylinder.

34. The engine of claim 23 wherein the said conduit valve is gas pressure operated.

35. The engine of claim 23 wherein the said conduit valve comprises a gas pressure relief valve.

36. The engine of claim 23 wherein the said conduit valve is operated by a combination of gas pressure and cam activation.

37. A two stroke internal combustion engine comprising:

at least one power cylinder, each said power cylinder having an inlet, an outlet, wherein said outlet of the said power cylinder is at least one exhaust port located in a side wall of the said power cylinder, the said side wall of the said power cylinder parallel to a longitudinal axis of the said power cylinder and a reciprocating power piston that creates a variable internal volume as it moves between an upward position and a downward position, wherein there is no crankcase ventilation/scavenging in said power cylinder during the complete two stroke cycle;

at least one pump cylinder associated with each said power cylinder, each said pump cylinder having an inlet, an outlet, and a reciprocating pump piston that creates a variable internal volume, each said pump cylinder adapted to receive either air, or a mixture of fuel and air, into the said pump cylinder as the said pump piston moves downwardly and to pump the air, or mixture of fuel and air, into the said power cylinder as the pump piston moves upwardly;

a conduit communicating between the said outlet of the pump cylinder, and the said inlet of the power cylinder, the said conduit having at least one poppet valve at the said inlet of the power cylinder, wherein the at least one poppet valve opens and closes the inlet of the said power cylinder only thru a single orifice;

a timer for coordinating movement of the said power piston, and the said pump piston;

a means for creating a mixture of fuel and air in the said power cylinder; wherein there is no fuel injector located in the side wall of the said power cylinder; and a means for igniting the mixture in the said power cylinder when the said power piston is at its upward position, the burning and expansion of which, moves the said power piston downwardly, and produces work.

38. The engine of claim 37 wherein the means for creating a mixture of fuel and air in the said power cylinder comprises a carburetor.

39. The engine of claim 37 wherein the means for creating a mixture of fuel and air in the said power cylinder comprises a fuel injector.

40. The engine of claim 37 wherein there is no valve at said pump cylinder outlet.

41. The engine of claim 37 wherein compression temperature is used for igniting the mixture in the said power cylinder.

42. The engine of claim 37 wherein the said timer comprises a means for varying the timing of the said power piston and said pump piston.

43. The engine of claim 37 wherein a spark plug is used to ignite the said mixture of fuel and air in the power cylinder.

44. The engine of claim 43 wherein the said conduit valve is gas pressure operated.

45. The engine of claim 43 wherein the said conduit valve is cam operated.

* * * * *